United States Patent
Liu et al.

(10) Patent No.: US 9,723,352 B2
(45) Date of Patent: Aug. 1, 2017

(54) USER INTERFACE INTERACTION SYSTEM AND METHOD FOR HANDHELD DEVICE AND TV SET

(71) Applicant: TCL MOBILE COMMUNICATION CO., LTD. HUIZHOU, Guangdong (CN)

(72) Inventors: Jiang Liu, Hui Zhou (CN); Jingjiang Yu, Hui Zhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 36 days.

(21) Appl. No.: 14/125,267

(22) PCT Filed: Sep. 17, 2012

(86) PCT No.: PCT/CN2012/081504
§ 371 (c)(1),
(2) Date: Dec. 10, 2013

(87) PCT Pub. No.: WO2013/097492
PCT Pub. Date: Jul. 4, 2013

(65) Prior Publication Data
US 2014/0130091 A1    May 8, 2014

(30) Foreign Application Priority Data
Dec. 28, 2011    (CN) .......................... 2011 1 0447137

(51) Int. Cl.
*G06F 3/038* (2013.01)
*G06F 3/0488* (2013.01)
(Continued)

(52) U.S. Cl.
CPC ....... *H04N 21/4222* (2013.01); *G06F 1/1626* (2013.01); *G06F 3/038* (2013.01);
(Continued)

(58) Field of Classification Search
CPC .......... H04N 21/4222; H04N 21/4126; H04N 21/42224; H04N 21/43635; G06F 3/03546; G06F 3/038; G06F 3/0488; G06F 3/1454
(Continued)

(56) References Cited

U.S. PATENT DOCUMENTS

| | | | |
|---|---|---|---|
| 2002/0080091 A1* | 6/2002 | Acharya | G06F 1/1632 345/2.1 |
| 2006/0026535 A1* | 2/2006 | Hotelling | G06F 3/0418 715/863 |

(Continued)

FOREIGN PATENT DOCUMENTS

| | | |
|---|---|---|
| CN | 1355994 A | 6/2002 |
| CN | 101166251 A | 4/2008 |

(Continued)

*Primary Examiner* — Nathan Flynn
*Assistant Examiner* — Tung T Trinh
(74) *Attorney, Agent, or Firm* — Shimokaji IP

(57) ABSTRACT

An interaction system and method for interaction between a handheld device and a television comprises the configuration and connection of a first HDMI transferring module and a television screen in addition to a configuration and connection of a second HDMI transferring module, a touch screen, a gesture managing module and a display managing module. A user interface system and method for interaction between a handheld device and a television can utilize a handheld device having a touch screen to operate the television without requiring the assistance of other hardware units, such as a mouse or keyboard. All the operations can be done by using only the handheld device, thereby reducing the costs of devices.

4 Claims, 4 Drawing Sheets

(51) Int. Cl.
  *H04N 21/422* (2011.01)
  *H04N 21/41* (2011.01)
  *H04N 21/4363* (2011.01)
  *G06F 1/16* (2006.01)
  *G06F 3/0354* (2013.01)
  *G06F 3/14* (2006.01)

(52) U.S. Cl.
  CPC ........ *G06F 3/03547* (2013.01); *G06F 3/0488* (2013.01); *G06F 3/04883* (2013.01); *H04N 21/4126* (2013.01); *H04N 21/42224* (2013.01); *H04N 21/43635* (2013.01); *G06F 3/1454* (2013.01); *G09G 2340/0407* (2013.01); *G09G 2370/04* (2013.01); *G09G 2370/12* (2013.01)

(58) Field of Classification Search
  USPC .................................. 725/37; 345/157, 173
  See application file for complete search history.

(56) References Cited

U.S. PATENT DOCUMENTS

| | | | | |
|---|---|---|---|---|
| 2008/0136786 | A1* | 6/2008 | Lanfermann | G06F 3/041 345/173 |
| 2009/0276813 | A1* | 11/2009 | Bleiweiss | H04N 19/115 725/82 |
| 2010/0002016 | A1* | 1/2010 | Kim | G06F 3/0416 345/660 |
| 2011/0004853 | A1* | 1/2011 | Chang | G06F 3/04883 715/863 |
| 2011/0248941 | A1* | 10/2011 | Abdo et al. | 345/173 |
| 2012/0229371 | A1* | 9/2012 | Sip | G09G 3/20 345/156 |
| 2012/0254808 | A1* | 10/2012 | Gildfind | 715/863 |
| 2012/0274547 | A1* | 11/2012 | Raeber | G06F 17/30011 345/156 |
| 2012/0274863 | A1* | 11/2012 | Chardon | G06F 17/30011 348/734 |
| 2013/0027314 | A1* | 1/2013 | Masaki | H04N 21/43615 345/168 |
| 2015/0046945 | A1* | 2/2015 | Zhang | H04M 1/72519 725/37 |
| 2015/0205396 | A1* | 7/2015 | Konishi | G06F 3/0488 345/173 |

FOREIGN PATENT DOCUMENTS

| | | |
|---|---|---|
| CN | 101753878 A | 6/2010 |
| EP | 2387238 A1 | 11/2011 |

* cited by examiner

USER INTERFACE INTERACTION SYSTEM AND METHOD FOR HANDHELD DEVICE AND TV SET

TECHNICAL FIELD

The present invention relates to a TV set system and a communication method, and in particular, relates to a UI interaction system and method for a handheld device and a TV set.

BACKGROUND

Currently with the trend of "high definition", "networking", and "intelligent" televisions, smart televisions have appeared. A smart television, however, should have the capability of obtaining TV programs through multiple channels such as with a network, an AV device and/or a PC. A program may be clearly displayed as expected by a customer on a large screen with simple operation through simple and integrated user interfaces. The future smart television may be an entertainment center through which a user can conduct many activities such as searching TV channels, recording TV programs, playing cable television programs, conducting network video, watching movies, and/or playing games.

In a time of smart phones and smart televisions, people have more choices for entertainment, and many people may hope that they can play games or choose and watch favorite movies directly on the television by a handheld device. UI interaction design, that is, user interface interaction, has been popular in recent years, and has been used for interaction between people and televisions or computers. UI interaction design can fully reflect the orientation and character of a product by not only making the product unique and tasteful, but also making a user's operation comfortable, simple, and free. As general televisions do not have a touch function, currently the commonly used method for interacting with a television is using a mouse or a keyboard. The above mentioned methods, however, cannot meet the requirements of a user for simple operation of a television through a handhold device. For instance, the above methods cannot support the user in playing a game requiring sliding operations in a large area when choosing a move or a song. Therefore, there is room for improvement in the prior art.

SUMMARY OF THE INVENTION

Considering the above drawbacks in the prior art, an object of the present invention may be to provide a UI interaction system and method for a handheld device and a TV set to solve the problem of operating a television through a handheld device.

An embodiment of the present invention may be as below:

A user interface (UI) interaction method for a handheld device and a TV set may comprise the steps of:

A. A television transferring EDID data of the television to a second HDMI transferring module through a first HDMI transferring module;

B. A handheld device transferring the EDID data of the television to a display managing module through the second HDMI transferring module;

C. The display managing module initializing UI display data with respect to the EDID data and outputting the UI display data to the television;

D. A gesture managing module initializing an operation mode to a cursor mode;

E. The handheld device receiving a touch event from a user, updating the UI display data and sending it to the television;

the operation mode may comprise a cursor mode and a touch mode;

when the touch event is a press event, the step E may comprise:

E11. Determining whether to switch the operation mode based on whether coordinates of the press event are in an operation mode switch area, and proceeding to the next step;

E12. Determining whether the operation mode is the cursor mode, and if so, saving coordinates of the press event without sending the touch event, and if not, sending the touch event, updating the UI display data and sending it to the television;

when the touch event is a move event, the step E comprises:

E21. Determining whether the operation mode is the cursor mode. If not, sending the touch event, updating the UI display data and sending the UI display data to the television, and if so, proceeding to the next step;

E22. Determining whether the move event moving distance is larger than a threshold. If not, the move event is not processed, and if so, then a cursor moving state is entered, a display position of the cursor is calculated and moved, and the UI display data is updated and sent to the television.

In an embodiment of the user interface interaction method for a handheld device and a TV set, in step E, when the touch event is the press event, and the coordinates of the press event are in the operation mode switch area, the operation mode may be switched to the touch mode.

In an embodiment, the operation mode switch area may be arranged at the top left of the touch screen.

A user interface (UI) interaction system for a handheld device and a TV set may comprise:

a television comprising a display screen and a first HDMI transferring module connected with the display screen;

a handheld device comprising a second HDMI transferring module, a display managing module, a gesture managing module and a touch screen connected in sequence;

the second HDMI transferring module and the first HDMI transferring module may be in a communicating connection, used for transferring EDID data of the television from the first HDMI transferring module to the display managing module, and the touch screen may be used for receiving a touch event performed by a user;

the display managing module may be used for initializing UI display data with respect to the EDID data, and transferring the UI display data to the television. The gesture managing module may be used to manage an operation mode.

In an embodiment of the user interface interaction system for a handheld device and a TV set, the operation mode may comprise a cursor mode and a touch mode. In an embodiment, the touch event may comprise a press event and a move event. In an embodiment, the touch screen may be arranged with an operation mode switch area for switching the operation mode. In an embodiment, the operation mode switch area may be arranged at the top left of the touch screen.

A user interface (UI) interaction method for a handheld device and a TV set, may comprise the steps of:

A. The television transferring EDID data of a television to a second HDMI transferring module through a first HDMI transferring module;

B. A handheld device transferring the EDID data of the television to a display managing module through the second HDMI transferring module;

C. The display managing module initializing UI display data according to the EDID data, and outputting the UI display data to the television;

D. A gesture managing module initializing an operation mode into a cursor mode; and E. The handheld device receiving a touch event from a user, updating the UI display data and sending it to the television.

In an embodiment of the user interface (UI) interaction method for a handheld device and a TV set, the operation mode may comprise a cursor mode and a touch mode. In an embodiment, the touch event in the step E may comprise a press event and a move event. In an embodiment, when the touch event is the press event, the step E may comprise the steps of:

E11. Determining whether to switch the operation mode according to whether the coordinates of the press event are in an operation mode switch area, and proceeding to the next step;

E12. Determining whether the operation mode is the cursor mode. If so, saving the coordinates of the press event without sending the touch event, and if not, sending the touch event, updating the UI display data and sending it to the television.

In an embodiment of the user interface interaction method for a handheld device and a TV set, when the touch event is the move event, the step E may comprise the steps of:

E21. Determining whether the operation mode is the cursor mode. If not, sending the touch event, updating the UI display data and sending it to the television, and if so, proceeding to the next step;

E22. Determining whether a moving distance of the move event is larger than a threshold. If it is not, the move event is not processed, and if it is, then a cursor moving state is entered, a display position of the cursor is calculated and moved, and the UI display data is updated and sent to the television.

In an embodiment of the user interface interaction method for a handheld device and a TV set, in step E, when the touch event is the press event, and the coordinates of the press event are in the operation mode switch area, the operation mode may be switched to the touch mode. In an embodiment, the operation mode switch area is may be arranged at the top left of the touch screen.

Beneficial effects: a UI interaction system and method for a handheld device and a TV set of the present invention may have a simple operation for choosing a movie or a song by only operating the touch screen of the handheld device, as well as meeting the requirements of a user for sliding on a large area when playing a game. This method may take advantage of high resolution television and simple handheld device operation. The present invention may use a handheld device with a touch screen to operate a television without requiring the assistance of other hardware units, such as a mouse or a keyboard, and all operations can be done with only the handheld device, thus reducing device costs.

DETAILED DESCRIPTION OF THE INVENTION

The present invention provides a UI interaction system and method for a handheld device and a TV set, which may be described in detail below. It should be understood that the exemplary embodiments described here are used for explaining the present invention only, with no intention to limit the scope of the present invention.

Figure 1:
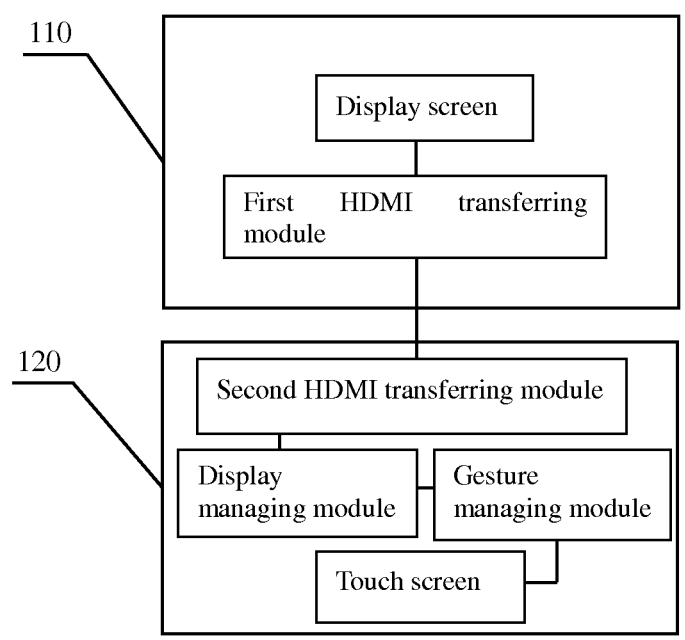
FIG. 1 is a schematic diagram showing the structure of a UI system for interaction between a handheld device and a TV set according to an embodiment of the present invention.

FIG. 1 is a schematic diagram showing the structure of a UI interaction system for a handheld device and a TV set of the present invention. UI interaction design, that is, user interface interaction, is a design that has been popular in recent years, and has been used for the interaction between people and machines. UI interaction design can represent the orientation and character of software by not only making a product unique and tasteful, but by also making a user's operation comfortable, simple, and free.

A UI interaction system for a handheld device and a TV set of the present invention may be achieved through a communicating connection between HDMI transferring modules arranged for a television 110 and a handheld device 120. HDMI (High Definition Multimedia Interface) refers to a high definition multimedia interface, which is a digital video or audio interface technology that may be capable of transferring audio signals and video signals simultaneously. As shown in FIG. 1, the television 110 may mainly comprise a first HDMI transferring module and a display screen, while the handheld device 120 may comprise a touch screen, a gesture managing module, a display managing module and a second HDMI transferring module connected in sequence.

In an embodiment of the present invention, the television 110 may be arranged with the first HDMI transferring module, the handheld device 120 may be equipped with the second HDMI transferring module, and a hardware interface used for HDMI transmission may be set on the handheld device 120. Therefore, the second HDMI transferring module of the handheld device 120 can be coupled to the first HDMI transferring module of the television 110 through a HDMI data cable in a communicating connection manner by a user. Under the HDMI Protocol, the handheld device 120 can obtain EDID data (Extended Display Identification Data) in the television 110. EDID is a data format defined by a standard published by VESA (Video Electronics Standards Association), which comprises parameters relating to performance of a TV including information such as the resolution of a television display screen, suppliers, maximum image size, color setting, and/or presetting of manufacturer.

The handheld device 120 can adjust its touch screen resolution so as to make it match with the display screen resolution of the television 110 according to the obtained EDID data. In an embodiment of the present invention, the handheld device 120 may obtain the EDID data of the television 110 in order to adjust the touch screen resolution of the handheld device 120 so as to improve a user experience with the handheld device 120. A display managing module of the handheld device 120 may initialize UI display data (user interface display data) according to the obtained EDID data such as the display screen resolution of the television 110, and may transfer the UI display data to the television 110 through the second HDMI transferring module and the first HDMI transferring module. The television 110 may then display the updated frames synchronously according to the UI display data rather than just displaying the touch screen resolution of the handheld device 120 on the television 110. The process mentioned above can ensure that the UI display data transferred from the handheld device 120 to the television 110 is a standard HDMI output, thus giving the advantage of high resolution television. The handheld device 120 can adapt to televisions 110 with various parameters through the HDMI connection between the handheld device 120 and the television 110. For instance, the users' televisions may be completely different in size and display screen resolution; however, they can output to high definition TVs by the UI display data transferred to them via the display managing module and the second HDMI transferring module of the handheld device 120.

As shown in FIG. 1, the handheld device 120 may be further provided with a gesture managing module and a touch screen. The gesture managing module can provide a switching function between a cursor mode and a touch mode, and accordingly an operation mode switch area may be arranged on the touch screen of the handheld device 120 for the user to switch an operation mode. With respect to hardware, there may need to be a coordination of the point-point relation between the touch screen of the handheld device 120 and the display screen of the television 110 by performing a touch at a location of the touch screen and showing the touch on the display screen at the corresponding location.

Figure 2:
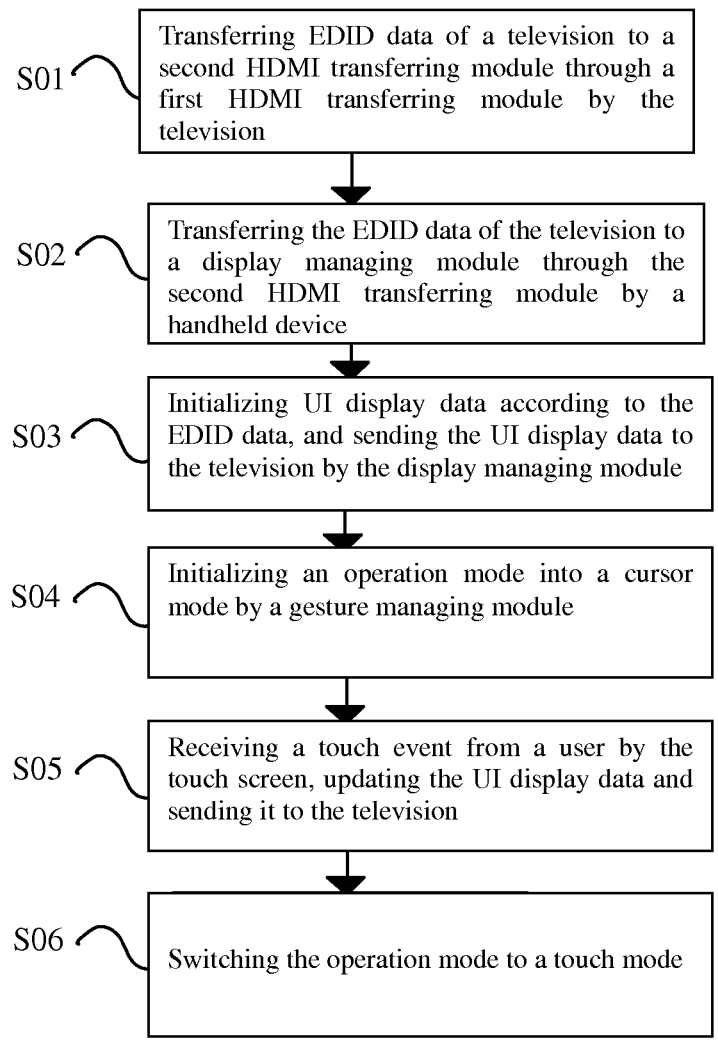
FIG. 2 is a flow chart of a UI method for interaction between a handheld device and a TV set according to an embodiment of the present invention.

Referring to FIG. 2, which is a flow chart of a UI interaction method for a handheld device and a TV set according to an embodiment of the present invention, as shown in FIG. 2, the UI interaction method may mainly comprise the steps of:

S01. The television 110 transferring EDID data of the television 110 to a second HDMI transferring module through a first HDMI transferring module, during the course of which the EDID data of the television may be first read by the CPU of the television 110, and then the EDID data of the television 110 may be read by the first HDMI transferring module, and thereafter may be transferred to the second HDMI transferring module for processing;

S02. Transferring the EDID data of the television 110 to a display managing module through the second HDMI transferring module by a handheld device 120, and the display managing module may initialize the UI display data after receiving the EDID data of the television 110;

S03. Initializing UI display data, and outputting the UI display data to the television 110 by the display managing module, that is the display managing module can initialize the UI display data according to the information included in the EDID data such as the screen resolution of the television 110. Then the display managing module may transfer the UI display data to the first HDMI transferring module through the second HDMI transferring module, and then have it displayed on the television 110 synchronously;

S04. Initializing an operation mode by a gesture managing module, the default operation mode can be set as a cursor mode, in which a user can locate the touch point of each minimum unit on the television accurately. Specifically, a small icon may be shown on the television screen to prompt the user for the current cursor location;

S05. Receiving a touch event from the user by the touch screen, updating the UI display data and sending the updated UI display data to the television 110 for response. Sliding on the touch screen of the handheld device 120 by the user may move the position of the cursor but it may not send the touch event to a current application such as a video selection application for response. After the user moves the cursor to a desired position, he or she can tap any area on the touch screen, and then the touch event may be sent to the current application. During the course of events, there may be a small icon shown on the television screen. The process of operating the television may be similar to that of operating a computer, and the coordinates of the touch event sent by the user may be the coordinates of the cursor displayed on the television screen rather than the coordinates of the position on the touch screen tapped by the user. In addition, the application program used by the user to perform control through the handheld device 120 may be a built-in application program of the handheld device 120 rather than an application program relevant or irrelevant to the television. The purpose of the present invention may be to control the television 110 through the operations performed on the handheld device 120 and display on the television 110 in order to take advantage of high television resolution and simple operation of the handheld device 120.

When the user needs to perform other operations, for instance needs to use the continuous-touch function or the sensor function, he or she can touch an operation mode switch area provided by the gesture managing module. The operation mode switch area can be arranged at the top left of the touch screen, and the operation mode can be switched to the touch mode by only one tap conducted within the operation mode switch area and may be switched back to the cursor mode when the user performs one tap again in the operation mode switch area.

Specifically, as shown in FIG. 2, the gesture managing module may initialize the operation mode as a cursor mode in step S04; and after step S05, the method may further comprise:

S06. Switching the operation mode to the touch mode, touching the touch screen and sending the touch event performed by the user. When the user needs to switch the operation mode to a touch mode, for instance when the user needs to perform sliding operations on a large area, he or she can switch the operation mode to the touch mode by tapping the operation mode switch area preset on the touch screen. For example, the touch event in the step S05 may be a press event with the coordinates in the operation mode switch area, and then the operation mode may be switched to the touch mode. Any touch operation such as tapping or sliding on the touch screen may be sent to an application such as a game application for responding. During the process, the television can respond to the movements according to the touch gesture, such as a single-point sliding or multi-point scaling, and the coordinates of the touch event sent by the user may be the coordinates of a position tapped or the coordinates of a slide on the touch screen by the user.

Continuing further, after a user sends a touch event by touching the touch screen, the handheld device 120 may determine the type of the touch event which may include a move event and a press event, and respond according to the type of the touch event correspondingly.

Figure 3:
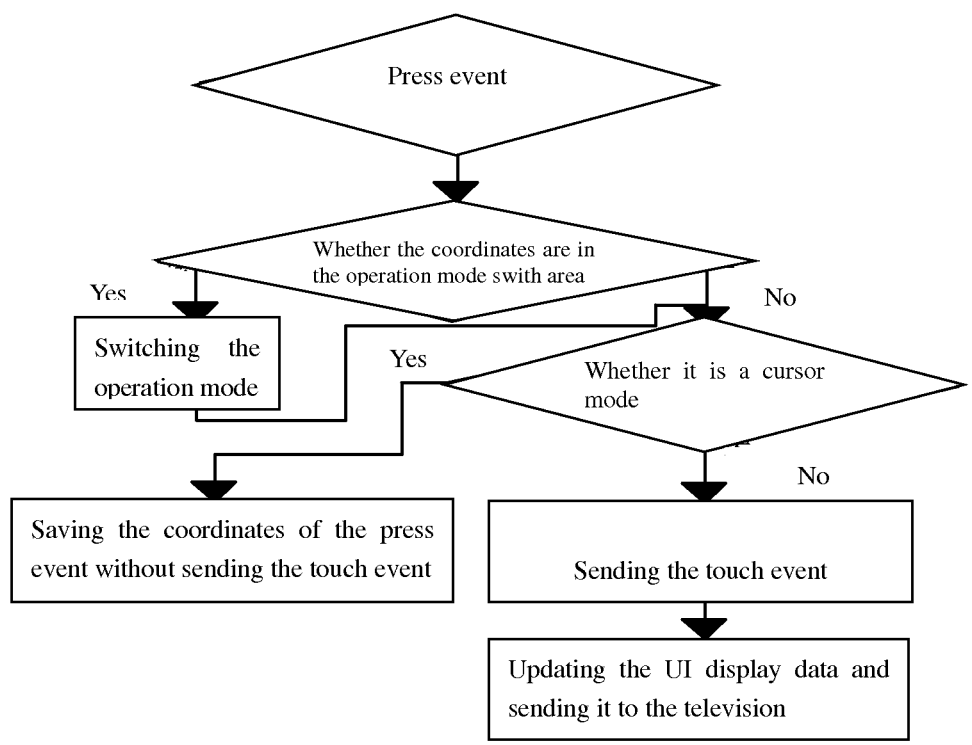
FIG. 3 is a flow chart showing the processing of a press event of a UI method for interaction between a handheld device and a TV set according to an embodiment of the present invention.

Referring to FIG. 3, which is a flow chart showing the processing of a press event of a UI interaction method for a handheld device and a TV set of the present invention, when the type of the touch event is a press event, as shown in the Figure, the step S05 may comprise:

L01. Determining whether the coordinates are in the operation mode switch area, and if so, switching the operation mode and proceeding to the next step, and if not, proceeding to the next step directly. In other words, after a press operation on the touch screen of the handheld device 120 is performed by the user, the handheld device 120 determines whether the coordinates of the press operation are in the operation mode switch area. If the coordinates are in the operation mode switch area, then the operation mode is switched, and if not, the next step is taken;

L02. Determining whether the operation mode is a cursor mode, and if so, saving the coordinates of the press event without sending the touch event, and if not, sending the touch event, updating the UI display data and sending it to the television 110. In the process, no matter what the current operation mode of the handheld device 120 is, the handheld device 120 may first determine whether it is in a cursor mode, and if so, saving the coordinates of the press event without sending the touch event, and if not, sending the touch event, updating the UI display data and sending it to the television 110.

Figure 4:
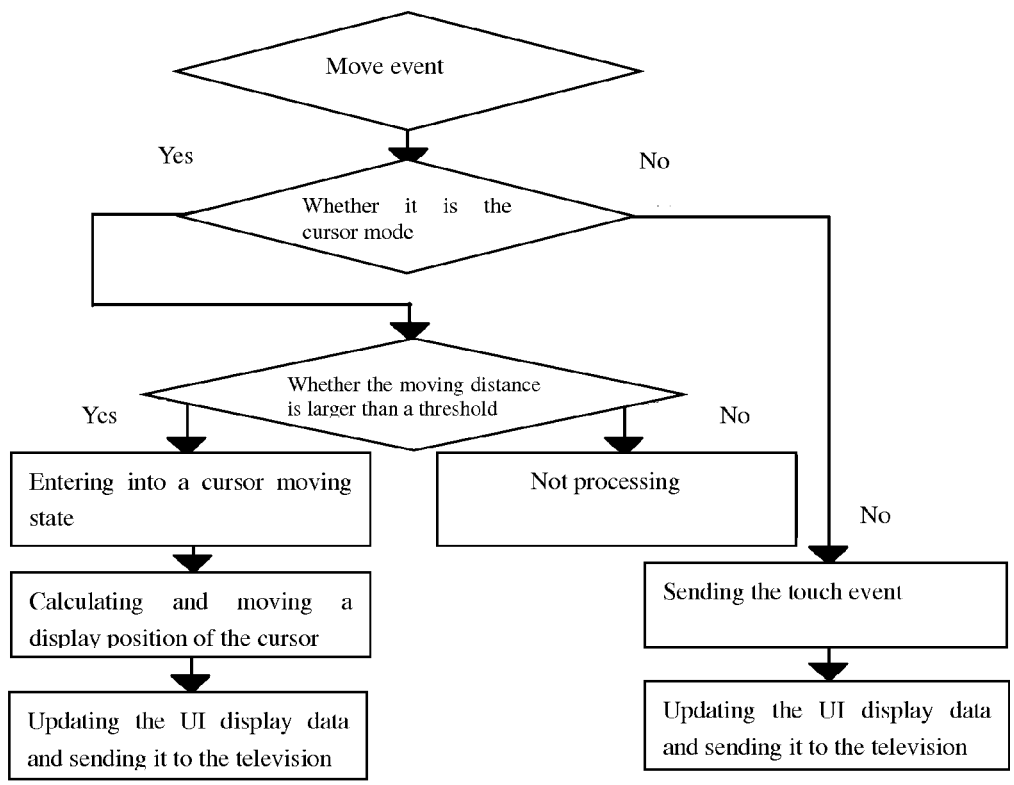
FIG. 4 is a flow chart showing the processing of a move event of a UI method for interaction between a handheld device and a TV set according to an embodiment of the present invention.

FIG. 4 is a flow chart showing the processing of a move event of a UI interaction method for a handheld device and a TV set of the present invention. When the touch event is a move event, as shown in the Figure, the step S05 may comprise:

T01. Determining whether it is in a cursor mode, and if not, sending the touch event, updating and sending the UI display data to the television 110. If so, proceeding to the next step. For example, when the user is moving on the touch screen, the handheld device may determine first whether the current operation mode is a cursor mode. If it is not a cursor mode, but is rather a touch mode, then the handheld device may send the touch event, update and send the UI display data to the television. If the current operation mode is cursor mode, then the handheld device proceeds to the next step;

T02. Determining whether a moving distance is larger than a threshold. If it is not, the move event is not processed, and if it is, then a cursor moving state is entered, the display position of the cursor is calculated and moved, and the UI display data is updated and sent to the television 110. For example, in the cursor mode, the handheld device determines whether the moving distance is larger than the threshold first after the user performs a move operation. If not, then no processing is conducted, and if the moving distance is larger than the threshold, then a cursor moving state is entered, the display position of the cursor is calculated and moved, and the UI display data is updated and sent to the television.

A UI interaction method and system for a handheld device and a TV set of the present invention may use a handheld device with a touch screen to operate a television without requiring assistance of other hardware units, such as a mouse or a keyboard. All operations can be done with the handheld device only, which may reduce device costs. In addition, the present invention may have the advantage of exceedingly simple operation, and it can achieve data transmission and operation between a handheld device and a TV set by using the existed HDMI interfaces. A movie or a song can be chosen by only operating the touch screen of the handheld device, and a user can slide in a large area when playing a game. This method can take advantage of high resolution television and the simple operation of a handheld device.

It should be understood that the application of the present invention is not limited to above described embodiments, and those who are skilled in the field may make improvements or variations according to the above description, and all the improvements and variations should fall within the scope of the claims attached to the present invention.

The invention claimed is:

1. A user interface (UI) interaction method for a handheld device and a television for choosing media content and playing games on the television using the handheld device, which comprises the steps of:

transferring EDID data (Extended Display Identification Data) of a television to a second HDMI (High Definition Multimedia Interface) transferring module through a first HDMI transferring module by the television;

transferring the EDID data of the television to a display managing module through the second HDMI transferring module by a handheld device;

adjusting a touch screen resolution of the handheld device to match with a display screen resolution of the television according to the EDID data;

initializing UI display data according to the EDID data and outputting the UI display data to the television by the display managing module;

initializing an operation mode to a cursor mode by a gesture managing module;

receiving a touch event from a user, updating the UI display data and sending it to the television by the handheld device to interact with a game display on the television, wherein the operation mode comprises a cursor mode, that includes the touch event and a move event and that enables movement of a cursor on the television via the handheld device, and a touch mode that enables sending the touch event to the television from the handheld device, wherein when the touch event is receiving the touch event from the user, the step of receiving the touch event from the user comprises:

determining whether to switch the operation mode according to whether coordinates of the press event are in an operation mode switch area, wherein the operation mode switch area is arranged at a top left of the touch screen of the handheld device;

deciding whether the operation mode is the cursor mode, and if so, saving the coordinates of the press event without sending the touch event, and if not, sending the touch event, updating the UI display data and sending the UI display data to the television, wherein the handheld device adapts to a plurality of types of televisions including high definition televisions, wherein when the touch event is a move event, the step of receiving a touch event from a user comprises:

determining whether the operation mode is the cursor mode, and if not, sending the touch event, updating the UI display data and sending the UI display data to the television;

determining whether a moving distance of the move event is larger than a threshold, and if not, not processing the move event, and if so, then entering a cursor moving state, calculating and moving a display position of the cursor, updating the UI display data and sending it to the television.

2. The user interface interaction method for a handheld device and a television according to claim 1, wherein in the step of receiving a touch event from the user, when the touch event is the press event, and the coordinates of the press event are in the operation mode switch area, the operation mode is switched to the touch mode.

3. The method of claim 1, wherein the operation mode is switched back and forth from the touch mode to the cursor mode by a tap on a touch screen of the handheld device.

4. The method of claim 1, wherein the display managing module further displays the UI display data on the television synchronously with the outputting UI display data.

\* \* \* \* \*